(No Model.)
G. A. BARLOW.
GATE.
No. 323,102. Patented July 28, 1885.
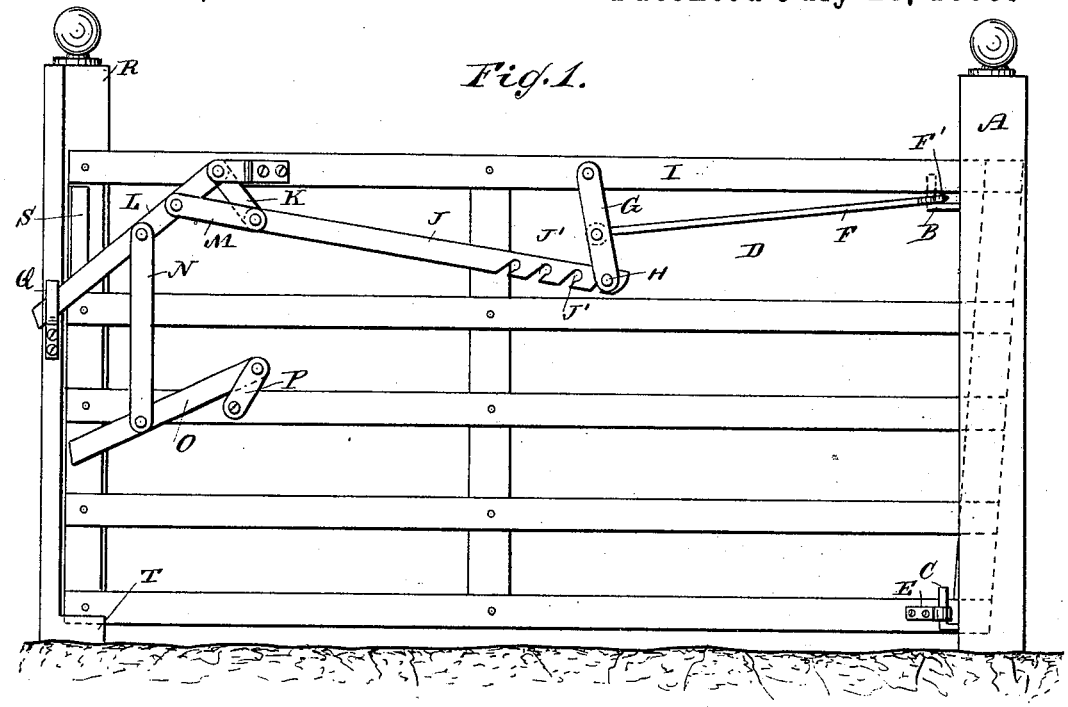
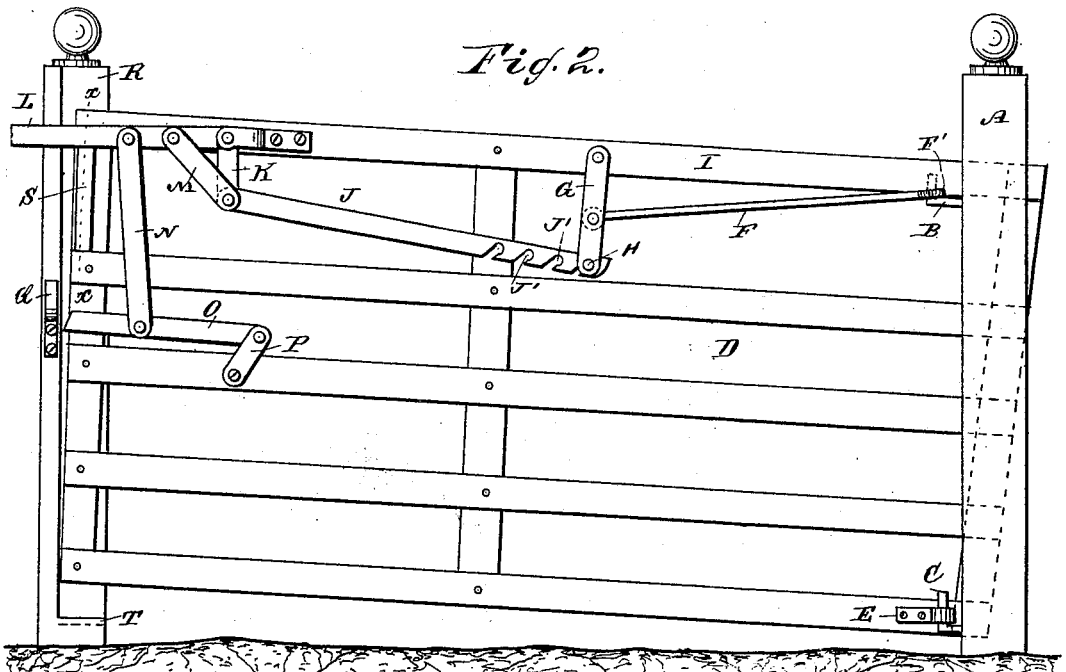
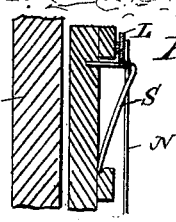
WITNESSES:
INVENTOR:
G. A. Barlow
BY Munn & Co.
ATTORNEYS.

UNITED STATES PATENT OFFICE.

GEORGE A. BARLOW, OF HAMILTON, MISSOURI.

GATE.

SPECIFICATION forming part of Letters Patent No. 323,102, dated July 28, 1885.

Application filed October 29, 1884. (No model.)

*To all whom it may concern:*

Be it known that I, GEORGE A. BARLOW, of Hamilton, in the county of Caldwell and State of Missouri, have invented a new and Improved Gate, of which the following is a full, clear, and exact description.

The object of my invention is to provide a new and improved gate which can easily be raised at the free or swinging end to clear snow or other obstructions on the ground.

The invention consists in the combination, with a gate, of an angle-lever pivoted on the swinging end of the gate, a bar connecting the lever with a hanger, and a rod pivoted to the hanger and provided at its free end with an eye, forming part of the top hinge, and of a latch-bar secured to the elbow-lever, whereby by raising the latch-bar the swinging end of the gate is raised.

Reference is to be had to the accompanying drawings, forming part of this specification, in which similar letters of reference indicate corresponding parts in all the figures.

Figure 1 is a face view of the gate lowered. Fig. 2 is a similar view, showing it raised. Fig. 3 is an enlarged sectional view on the line $x\,x$, Fig. 2.

From one corner of the gate-post A the hinge-hooks B C project diagonally, the upper hook, B, projecting farther than the lower hook, C.

The gate D is provided on its inner surface at the lower right-hand corner with an elongated eye, E, through which the prong of the lower hook, C, passes.

The prong of the upper hook, B, is passed through an eye, F', formed on one end of a rod, F, having its opposite end pivoted between two links, G, of a hanger pivoted to the top rail, I, of the gate, the lower ends of the links G being united by a cross-pin, H.

A bar, J, having a series of inclined notches, J', in the bottom edge at one end, is passed between the links G and rests upon the pin H, the opposite end of the said bar being pivoted to the end of one shank of an angle-lever, K, pivoted on the gate, to the other shank of which lever K a flat bar, L, is secured. A brace, M, unites the ends of the angle-lever K.

A connecting-bar, N, is pivoted to the bar L and to a "boy" handle-lever, O, pivoted to a link, P, pivoted on the gate.

A catch, Q, is secured on the gate-post R for holding the bar L when lowered, and a beveled rest, S, is secured on the gate for supporting the bar L when the same is raised. As the hook B projects farther than the hook C, the gate will gain or rise as it opens, and thus will swing back automatically when released. When the bar L comes against the post, it is thrown over the catch Q and thus locks the gate automatically.

The post R has an offset, T, on which the free end of the bottom of the gate can be rested.

The gate is opened and closed as follows: As shown in Fig. 1, the gate is closed and locked. To open it the latch-bar L is raised, whereby the links G are swung toward the free end of the gate, and as the rod F is held on the hook B the top of the gate will be moved toward the post A. The lower part of the gate cannot move toward the post A, as it is held by the hook C and eye E, thereby causing the outer upper corner of the gate to swing upward.

By resting the lever or bar L on the rest S the gate is held raised, and can be swung toward or from the post R. By swinging down the lever L the gate is released and is also swung down.

The bar L can be raised directly or by means of the lever O and the bar N. When the gate is closed, the bar L engages the catch Q. As shown, the pin H on the links G is held in that notch J' nearest the free end of the bar J.

If a greater inclination of the gate is desired, the operator simply takes hold of either bar of the gate and raises it, whereby the bar J passes through the hanger G a greater distance into one of the notches J' nearer the free end of the gate.

The gate swings easily, and requires very little power to raise its swinging end. It can be held raised to permit hogs, &c., to pass under it, and it can be held in any position, when open, by letting it rest on the ground.

The boy-lever O also serves as a latch when the gate is raised to its highest inclination.

The upper rear corner of the gate is held in place against the post by the prong of the hook B, which passes up outside of the top rail of the gate.

Having thus described my invention, what I claim as new, and desire to secure by Letters Patent, is—

1. The combination, with a gate, of the elbow-lever K, the bar J, the links G, the rod F, the bar L, the connecting-bar N, the link P, the lever O, the eye E on the bottom inner corner of the gate, and the hooks B C on the post A, substantially as herein shown and described.

2. The combination, with a gate, of the elbow K, the bar J, having notches J', the links G, the pin H, the rod F, bar L, connecting-bar N, the link P, lever O, the eye E on the bottom of the inner corner of the gate, and the hooks B C on the post A, substantially as herein shown and described.

3. The combination, with a gate, of the elbow-lever K, the bar J, the links G, the rod F, the bar L, and the rest S on the free end of the gate, substantially as herein shown and described.

4. The combination, with a gate, of the elbow-lever K, the bar J, the links G, the rod F, the bar L, the connecting-bar N, the link P, and the lever O, substantially as herein shown and described.

5. The combination, with a gate, of an angle-lever pivoted on the swinging end of the gate, a bar connecting the lever with a hanger, a rod pivoted to the hanger and provided at its free end with an eye forming part of the top hinge, and of a latch-bar secured on the elbow-lever, whereby, by raising the said latch-bar, the swinging end of the gate is raised, substantially as herein shown and described.

GEORGE A. BARLOW.

Witnesses:
   JOHN N. MORTON,
   HENRY C. SEARLS.